US011558752B2

(12) United States Patent
Aktas et al.

(10) Patent No.: US 11,558,752 B2
(45) Date of Patent: Jan. 17, 2023

(54) ACCESS SPECTRUM ASSIGNMENT

(71) Applicant: Telefonaktiebolaget LM Ericsson (publ), Stockholm (SE)

(72) Inventors: Ismet Aktas, Neuss (DE); Junaid Ansari, Fürth (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 115 days.

(21) Appl. No.: 16/472,542

(22) PCT Filed: Dec. 23, 2016

(86) PCT No.: PCT/EP2016/082591
§ 371 (c)(1),
(2) Date: Jun. 21, 2019

(87) PCT Pub. No.: WO2018/114000
PCT Pub. Date: Jun. 28, 2018

(65) Prior Publication Data
US 2021/0136590 A1    May 6, 2021

(51) Int. Cl.
*H04W 16/14* (2009.01)
*H04W 28/08* (2009.01)
(Continued)

(52) U.S. Cl.
CPC .......... *H04W 16/14* (2013.01); *H04L 67/125* (2013.01); *H04W 28/0992* (2020.05); *H04W 80/12* (2013.01)

(58) Field of Classification Search
CPC . H04W 16/14; H04W 28/0992; H04W 80/12; H04W 72/12; H04W 76/00;
(Continued)

(56) References Cited

U.S. PATENT DOCUMENTS

2014/0011509 A1  1/2014  Markwart et al.
2015/0281971 A1  10/2015  Mueck et al.
(Continued)

FOREIGN PATENT DOCUMENTS

CN    1444809 A    9/2003
CN    1770743 A    5/2006
(Continued)

OTHER PUBLICATIONS

International Search Report and Written Opinion of the International Searching Authority, PCT/EP2016/082591, dated Oct. 2, 2017, 17 pages.
(Continued)

*Primary Examiner* — Robert J Lopata
(74) *Attorney, Agent, or Firm* — Sage Patent Group

(57) ABSTRACT

A method of transmission scheduling for one or more process devices in an industrial application, such as a sensor, an actuator and/or a process controller, capable of wireless communication, implemented by a radio control unit, is proposed, the method comprising: determining with respect to the industrial application whether a licensed shared access spectrum is available and assigning to the one or more process devices, based on a traffic type of the data to be transmitted by the one or more process devices, an access spectrum within the licensed shared access spectrum.

16 Claims, 14 Drawing Sheets

(51) Int. Cl.
*H04L 67/125* (2022.01)
*H04W 80/12* (2009.01)

(58) Field of Classification Search
CPC .... H04W 72/04; H04L 67/125; H04B 7/2121; H04B 7/2123; H04J 2203/0069
USPC .......................................................... 370/329
See application file for complete search history.

(56) References Cited

U.S. PATENT DOCUMENTS

| | | | |
|---|---|---|---|
| 2016/0066261 A1* | 3/2016 | Nasielski | H04M 15/8044 455/406 |
| 2016/0183269 A1 | 6/2016 | Badic et al. | |
| 2017/0041801 A1* | 2/2017 | Liu | H04W 16/10 |
| 2018/0213407 A1* | 7/2018 | Miao | H04W 16/14 |

FOREIGN PATENT DOCUMENTS

| | | |
|---|---|---|
| CN | 105144768 A | 12/2015 |
| WO | WO 2015/187282 A1 | 12/2015 |
| WO | WO 2015/199732 A1 | 12/2015 |
| WO | 2016089274 A1 | 6/2016 |

OTHER PUBLICATIONS

Shehzad A. Ashraf et al., Ultra-Reliable and Low-Latency Communication for Wireless Factory Automation: From LTE to 5G, Ericsson Research, Aachen, Germany, Linköping, Sweden, 978-1-5090-1314-2/16/$31.00 2016 IEEE, 8 Pages.

Markus Dominik Mueck et al., INTEL, "Spectrum Sharing: Licensed Shared Access (LSA) and Spectrum Access System (SAS)", Spectrum Sharing—LSA and SAS (Version v1.0), Oct. 2015, Accessed from https://www.intel.com/content/dam/www/public/us/en/documents/white-papers/spectrum-sharing-lsa-sas-paper.pdf, 27 Pages.

Spectrum Access System (SAS), Federated Wireless, Accessed from http://www.federatedwireless.com/solutions/sas on Nov. 25, 2016, 5 Pages.

Colin Gibbs, "Google, Nokia and others forge alliance for 3.5 GHz CBRS", FierceWireless, Aug. 23, 2016, Accessed from https://www.fiercewireless.com/wireless/google-nokia-and-others-forge-alliance-for-3-5-ghz-cbrs on Nov. 25, 2016, 3 Pages.

Jaap Van De Beek et al., "TV white space in Europe", IEEE Transactions of Mobile Computing, vol. X, No. Y, Jan. 2022, IEEE Computer Society, 2011 IEEE, Accessed from https://www.inets.rwth-aachen.de/fileadmin/templates/images/PublicationPdfs/2012/TMC_TVWS_vandeBeek_etal_preprint.pdf, 13 Pages.

First Chinese Office Action for Chinese Patent Application No. CN 201680092092.8 dated Oct. 19, 2022, 13 pages (including English translation).

* cited by examiner

ACCESS SPECTRUM ASSIGNMENT

This application is a 35 U.S.C. § 371 national stage application of PCT International Application No. PCT/EP2016/082591 filed on Dec. 23, 2016, the disclosure and content of which is incorporated by reference herein in its entirety.

TECHNICAL FIELD

The present disclosure relates to access spectrum assignment, for one or more process devices in an industrial application, a method of data transmission in an industrial application, a radio control unit, and a process device. More particularly the present disclosure relates to an access spectrum assignment within a licensed shared access spectrum. Furthermore, the present disclosure relates to corresponding computer programs.

BACKGROUND

Wireless communication is commonly performed through the exchange of electromagnetic signals within a particular portion of the electromagnetic spectrum. Radio communication in particular is commonly performed though the exchange of signals within a subset of the electromagnetic spectrum called the radio spectrum (which is typically considered to lie between 3 Hz and 3 THz). To facilitate practical and coordinated use of the radio spectrum, different bands of the radio spectrum have been set aside for particular uses. For example, longwave communication is typically performed in the low frequency (LF) range between 148.5 kHz and 283.5 kHz, whereas shortwave communication is typically performed in the high frequency (HF) range between 5.9 MHz and 26.1 MHz. Other bands are used for a variety of purposes, including communication via Long Term Evolution (LTE), Global System for Mobile Communication (GSM), Wi-Fi, and others. The tuning of radio circuitry allows for signals to be transmitted and received at a particular frequency so that radio signals can be wirelessly sent and received between radio stations, such as mobile stations and/or base stations. Spectrum for performing radio communication is a finite resource. The more crowded transmissions are within a given spectrum, the more those transmissions tend to interfere with each other. As society continues to embrace radio communication, the available spectrum has become increasingly utilized, and therefore increasingly crowded.

SUMMARY

Support of ultra-low latency and reliable machine-type communication (MTC), i.e., Critical-MTC (C-MTC) or Ultra Reliable Low Latency Communication (URLLC), needs to be offered by wireless communication in order to meet the low latency and high reliability requirements of industrial applications. One of the limiting conditions to allow this is the system capacity, which is dependent upon the available spectrum bandwidth. With an increasing number of process devices such as sensors, actuators (e.g., robots) and/or process controllers in a factory and their varying traffic needs (e.g., packet sizes, inter arrival time of packets, priority, real-time requirements, or the combination of one or more of the mentioned factors, etc.), capacity limitations, i.e., with a certain spectrum bandwidth a specific number of devices can occur. Furthermore, usage of licensed spectrum may invoke costs for a license allowing the factory owner to use said licensed spectrum and testing within the licensed spectrum is not possible without a license or permission. On the other hand, usage of unlicensed spectrum has to be shared with other users and thus interference may occur. In unlicensed spectrum, channel access cannot be guaranteed due to its non-deterministic nature. Said non-deterministic nature may result from regulations that mandate the use of Listen-Before-Talk (LBT) or a duty cycle, or transmit power constraints. Often, sharing principles like Dynamic Frequency Selection (DFS), LBT, Transmission Opportunity (TXOP), etc., may also have to be implemented when transmission within a spectrum is desired. Hence, one may need to take measures to minimize the "harmful" spectral interference to support coexistence with other technologies, e.g. imposed by Federal Communications Commission (FCC). Consequently, specific QoS (Quality of Service) requirements cannot be guaranteed in the licensed and/or unlicensed spectrum. The present disclosure proposes to overcome these detriments.

According to a first aspect a method of transmission scheduling for one or more process devices in an industrial application, such as a sensor, an actuator and/or a process controller, capable of wireless communication, implemented by a radio control unit, is proposed, the method comprising: determining with respect to the industrial application whether a licensed shared access spectrum is available and assigning to the one or more process devices, based on a traffic type of the data to be transmitted by the one or more process devices, an access spectrum within the licensed shared access spectrum.

According to a second aspect a method of data transmission in an industrial application, implemented by a process device, such as a sensor, an actuator and/or a process controller, capable of wireless communication, is proposed, the method comprising: performing data transmission of a traffic type within an access spectrum of a licensed shared access spectrum, based on an access spectrum assignment for the process device in the industrial application obtained by a radio control unit.

According to a third aspect a radio control unit operative to perform the method steps of the first aspect is proposed.

According to a fourth aspect a process device capable of wireless communication operative to perform the method steps of the second aspect is proposed.

According to a fifth aspect a computer program comprising instructions which, when executed on at least one processor of a radio control unit, cause the at least one processor to carry out the method according to the first aspect is proposed.

According to a sixth aspect a computer program comprising instructions which, when executed on at least one processor of a process device capable of wireless communication, cause the at least one processor to carry out the method according to the second aspect is proposed.

Other aspects comprise a carrier containing one or more of the computer programs and/or instructions described above, wherein the carrier is one of an electrical signal, optical signal, radio signal, or computer readable storage medium.

Of course, the present disclosure is not limited to the above features and advantages. Indeed, additional features and advantages are presented in the following detailed description, and in the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be described in detail below, aspects of the present disclosure may be implemented entirely as hardware units, entirely as software modules (including firmware, resident software, micro-code, etc.), or as a combination of software units and hardware modules. For example, embodiments of the present disclosure may take the form of a non-transitory computer readable medium storing software instructions in the form of a computer program that, when executed on a programmable device, configures the programmable device to execute the various methods described below.

Figure 1:
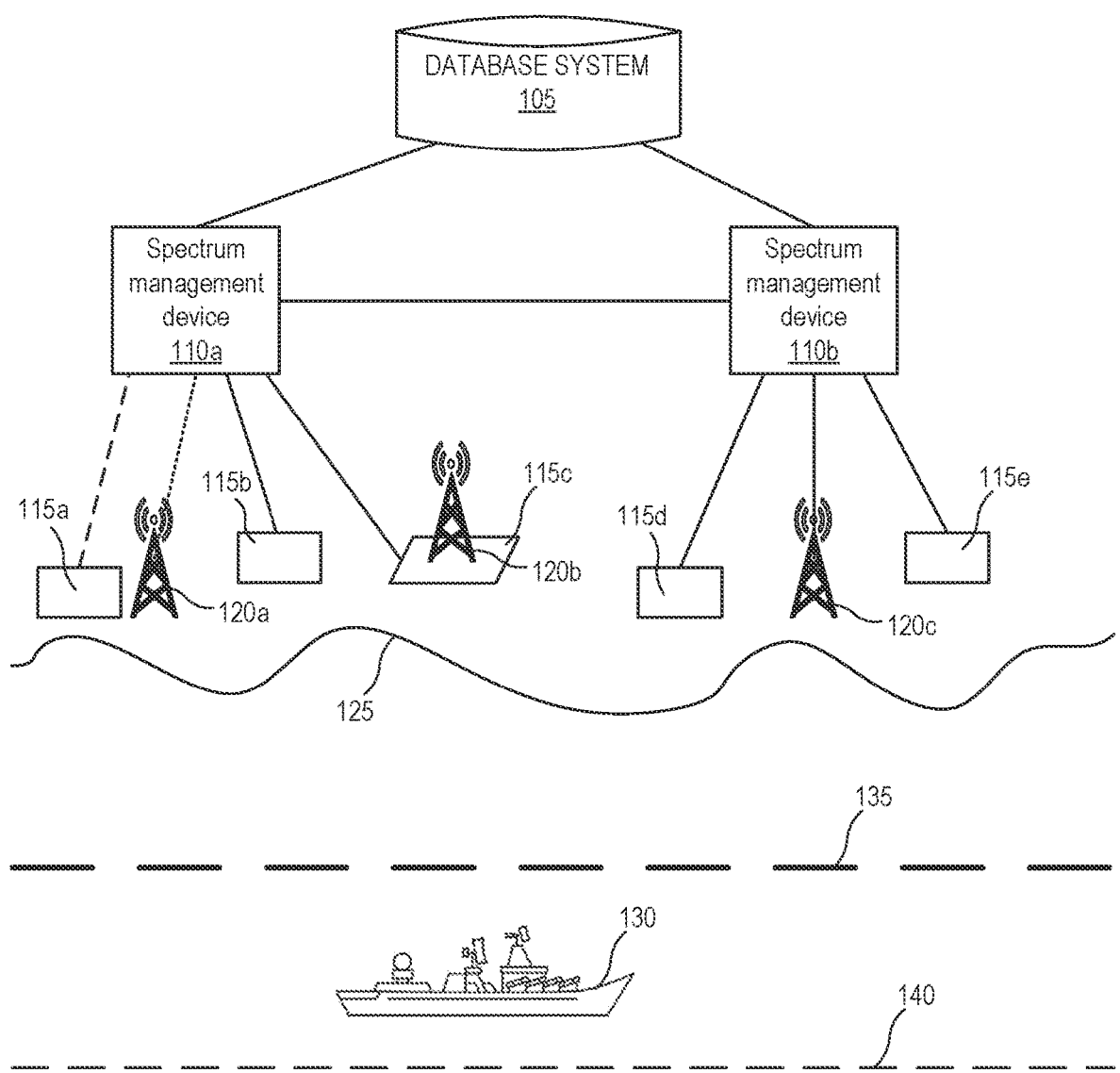
FIG. 1 is a block diagram illustrating an example environment in which use is made of a licensed shared access spectrum.

In general, embodiments of the present disclosure relate to one or more radio control units and/or one or more process devices. FIG. 1 illustrates an example environment 100 in which one or more radio control units such as spectrum management devices 110a, 110b and radio access nodes 120a-c are operating. In the example of FIG. 1, the environment 100 comprises a database system 105 for administrating a licensed shared spectrum, two spectrum management devices 110a-b, three radio access nodes 120a-c, five radio sensor stations 115a-e, and an incumbent user 130. In the following the licensed shared spectrum and its usage will be explained in more detail.

Each of the radio access nodes 120a-c transmit and/or receive signals via one or more respective antennas. The collective signals are transmitted and/or received within a particular frequency spectrum through the air to mobile stations (not shown) within signal range 135. Each of the radio access nodes 120a-c are also configured to electronically communicate with a spectrum management device 110, e.g., via a communications network (not shown). Examples of a radio access node 120 include a Citizens Broadband Radio Service Device (CBRS), radio base station (RBS), femtocell, and a wireless access point (WAP), or other candidate spectra such as 600 MHz, 3.5 GHz, 2.3 GHz bands. In this example, the radio access nodes 120a-c are arrayed along a coastline 125 to provide wireless network access to mobile stations along the coast, whether on land or at sea. Other embodiments may involve radio access nodes 120a-c that are located in other geographic settings.

Each of the spectrum management devices 110a-b is configured to exchange messages with one or more of the radio access nodes 120a-c, e.g., via a communications network (not shown). In this particular example, spectrum management device 110a communicates with, and manages access to spectrum resources by, radio access nodes 120a-b. Similarly, spectrum management device 110b communicates with, and manages access to spectrum resources by, radio access node 120c. Such communication may include, for example, a request from a radio access node 120 to a spectrum management device 110 for spectrum access. Such communication may also include a response from the spectrum management device 110 to the radio access node 120 that assigns particular spectrum resources to that radio access node 120. Such spectrum resources may be in the frequency, time, and/or geographical domain, according to various embodiments.

Each of the spectrum management devices 110a-b is also configured to communicate with one or more of the radio sensor stations 115a-e. In this particular example, spectrum management device 110a communicates with radio sensor stations 115a-c, and spectrum management device 110b communicates with radio sensor stations 115d-e. According to some embodiments, the spectrum management devices 110a-b may also communicate with each other, for example, to share information received from the radio sensor stations 115a-e, to share information about spectrum resources assigned to the corresponding radio access nodes 120a-c, and/or to negotiate the assignment of resources to be assigned to the radio access nodes 120a-c. Such resources, in particular when they comprise frequency information, may be referred to as access spectrum which may be utilized for wireless, that is radio, communication.

Each radio sensor station 115a-e detects radio signals transmitted. Collectively, the radio sensor stations 115a-e detect radio signals transmitted within a sensor range 140. In particular, radio sensor station 115c may be a component of, attached to, and/or collocated with radio access node 120b. In this example, the radio sensor stations 115a-e are also arrayed along the coastline 125, and detect spectrum resource utilization along the coast, whether on land or at sea. In this particular example, the sensor range 140 of the radio sensor stations 115a-e extends farther from the coastline 125 than the signal range 135 of the radio access nodes 120a-c.

Each radio sensor station 115a-e reports the detected utilization of spectrum resources to its corresponding spectrum management device 110a-b. In this way, the spectrum management devices 110a-b receive feedback from the radio sensor stations 115a-e with regard to actual spectrum resources being utilized. According to embodiments, each of the spectrum management devices 110a-b may use such feedback to assign unutilized (or underutilized) spectrum resources to one or more corresponding radio access nodes 120a-c.

Some users in the environment 100 may operate wireless systems that are of critical importance. For example, the operation of devices supporting military, police, ambulatory, and/or firefighting personnel may be necessary for the national defense, public safety, and/or lifesaving. Such a critically important user may be an incumbent user 130. An incumbent user 130 is defined as a user that is prioritized above all non-incumbent users of a given spectrum such that it may use any portion of that given spectrum at any time without notice. All non-incumbent users are required to accommodate use of spectrum resources by the incumbent user 130, e.g., by evacuating those resources as necessary and/or keeping such portion of the spectrum clear.

In the particular example of FIG. 1, the incumbent user 130 is illustrated as a military vessel operating a radar system within the sensor range 140 of the radio sensor stations 115a-e. Radar is a system that determines the presence and location of one or more objects by transmitting a radio wave and measuring the time it takes for an echo of that radio wave to return. Each of the radio sensor stations 115a-e that detects this use of spectrum resources by incumbent user 130 reports the use of those spectrum resources to a corresponding spectrum management device 110a-b. In some embodiments, one or more of the radio sensor stations 115a-e also reports information useful for determining the location of the incumbent user 130, e.g., a spectrum resource utilization detection time, an identification of the incumbent user 130, and/or position information. The spectrum management devices 110a-b, in response, notify one or more of their corresponding radio access nodes 120a-c to discontinue use of the spectrum resources being used by the incumbent user 130, e.g., to prevent interference with the operation of the incumbent user 130 by the one or more radio access nodes 120a-c.

In this particular example, the radio sensor stations 115a-e are configured such that their sensor range 140 allows them to detect the radar system operated by the incumbent user 130 before the incumbent user 130 enters the signal range 135 of the radio access nodes 120a-c (i.e., when the incumbent user 130 approaches the coastline 125 by sea with its radar system active). As will be discussed in greater detail below, such a design may, in some embodiments, avoid interfering utilization of the same spectrum resources between one or more of the radio access nodes 120a-c and the incumbent user 130.

In some embodiments, the utilization of spectrum resources by a user (whether incumbent or not) is spontaneous and/or anonymous. For example, a military vessel that is an incumbent user 130 may spontaneously and anonymously use spectrum resources because the movement and operation of the military vessel may be purposefully clandestine (such as for national security reasons). In contrast, a pirate broadcaster that is not an incumbent user 130 may also decide to spontaneously and anonymously use those spectrum resources. Accordingly, a spectrum management device 110 that determines that a particular user detected by a radio sensor station 115 is an incumbent user 130, e.g., to determine whether spectrum needs to be cleared for the detected use.

In some embodiments, the determination that a particular user is an incumbent user 130 is based (at least in part) on that user's location. For example, an emergency broadcast system may be an incumbent user 130 that intermittently operates radio equipment at a fixed location known to one or more of the spectrum management devices 110a-c. In response to information from one or more radio sensor stations 115a-e indicating that spectrum resources are being utilized from that location, one or more of the spectrum management devices 110a-b may notify one or more radio access nodes 120a-c to discontinue use of those spectrum resources. The location of the incumbent user 130 may be determined, e.g., by the time-of-arrival of a signal originating from the incumbent user 130 that is detected by two or more of the radio sensor stations 115a-e. Other positioning approaches may also be employed, according to various embodiments.

In a different example, a spectrum management device 110 does not know the location of an incumbent user 130 within the environment 100 in advance of the incumbent user 130 being detected by a radio sensor station 115, such as in the case of the clandestine military vessel discussed above. In such an example, a spectrum management device 110 may communicate with the database system 105 to determine that the source of spectrum utilization is an incumbent user 130. The database system 105 may be a licensed shared spectrum control unit. The (spectrum) database system may also comprise using dedicated spectrum sensors. This REM (radio environmental map) formation can be an external service too. The database system 105 may be operated by a government agency and/or regulatory authority (e.g., the United States Federal Communications Commission) and may be aware of the location of the incumbent user 130 of FIG. 1. In response to determining that spectrum resources are being used at a particular location (e.g., based on reports from one or more radio sensor stations 115a-e), a spectrum management device 110 queries the database system 105 for whether there is an incumbent user 130 at the detected location. If the database system 105 responds by indicating that an incumbent user is at the detected location, the spectrum management device 110 may send notification to discontinue use of those spectrum resources (e.g., to one or more corresponding radio access nodes).

During the absence of an incumbent user or if not the whole licensed share spectrum is required by the one or more incumbents the unused part of the licensed shared spectrum may be assigned to other users. In particular licensed shared spectrum may be available in the inland, i.e. offside the coast or coastline. Such a user may for example require such part of the spectrum for an industrial application IA, cf. FIG. 4. Hence, the licensed shared spectrum may be assigned to one or more process devices in the industrial application in order to guarantee Quality-of-Service and/or for offloading data traffic. Besides, the licensed shared spectrum can be coexistent with other types of spectra being used, as e.g. licensed spectrum and/or unlicensed spectrum. Thence, here can be one or more bands from one or more spectrum types. This is in particular beneficial since radio signal behavior can be different even within a spectrum type, e.g., different frequency bands within the unlicensed spectrum can behave differently, for example the 2.4 GHz unlicensed spectrum is different (radio propagation characteristics, bandwidth, regulations, hardware design complexity, acceptance in market) from the 60 GHz unlicensed spectrum.

Figure 2:
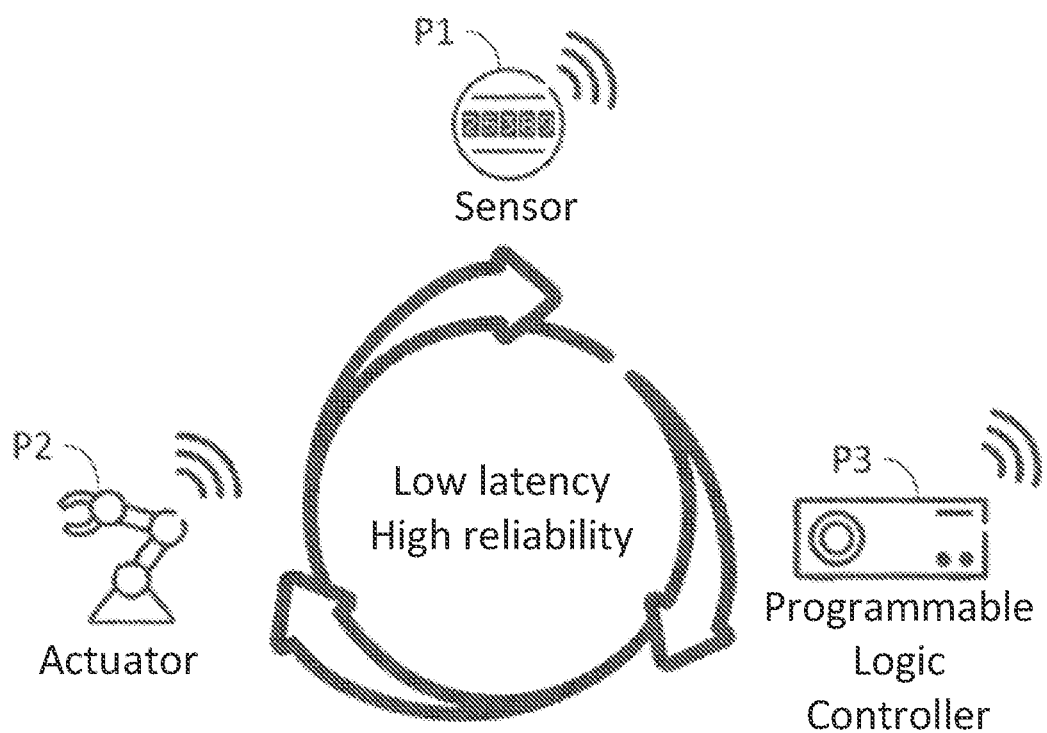
FIG. 2 is a schematic representation of communication between process devices in an industrial process.

FIG. 2 illustrates an industrial application IA comprising process devices such as a sensor, an actuator and a programmable logic controller (PLC). Industrial applications typically are used for automation purposes. In an exemplary use-case scenario, one or more work pieces are placed on a moving conveyor belt. An actuator, in this case a robot, may pick up a work piece from the moving conveyor belt. The position of the work piece may be measured through one or more sensors mounted on the conveyor belt, and sent periodically to the PLC. Based on the positioning info, the PLC may send commands to the robot arm to accordingly position itself so that the work piece can be picked up. Commands are also sent from PLC to robot to pick up the work piece. After picking a work piece, the robot may be instructed to place the work piece back on the conveyor belt. This automation scenario involves sending sensor readings to PLC and commands to a robot at an update interval of e.g. 5 ms. However, other, even smaller, update intervals may be chosen. The communication and the line of events is illustrated by the curved arrows in FIG. 2. Such an industrial automation use-case may rely on low latency and high reliability wireless communication, that is the communication between the one or more process devices may be carried out wirelessly by radio communication.

One key objective of 5G is the support of ultra-low latency and reliable machine-type communication, i.e., Critical-MTC or Ultra Reliable Low Latency Communication (URLLC), which needs to address the low latency and high reliability requirements of industrial applications. One of the key limiting conditions is the system capacity, which is dependent upon the available spectrum bandwidth. With an increasing number of process devices, such as sensors and actuators (e.g., robots) in a factory and their varying traffic needs (e.g., packet sizes inter arrival time of packets, priority, reliability, real-time requirements, etc.), deploying only a single base station (BS) may be impractical due to capacity limitations, i.e., with a certain spectrum bandwidth a specific number of process devices can be supported. Additionally, in the typical industrial applications or industrial deployment scenarios, the process devices in a given process are located in close proximity of one another. This naturally warrants small cell deployments. In other words, dedicated radio resources assigned to a certain number of process devices could become a bottleneck in order to meet their latency and reliability requirements.

Figure 3:
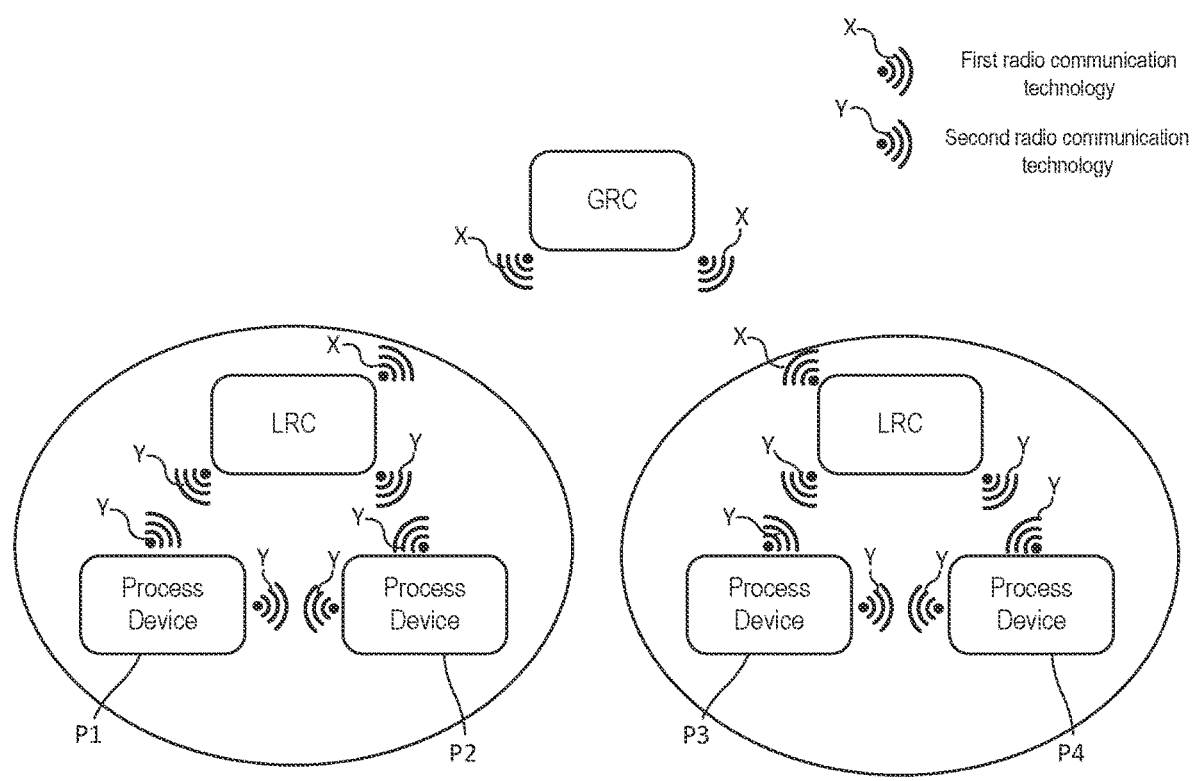
FIG. 3 is a schematic representation of a two-tier coordination hierarchy for wireless communication in an industrial process.
Figure 4:
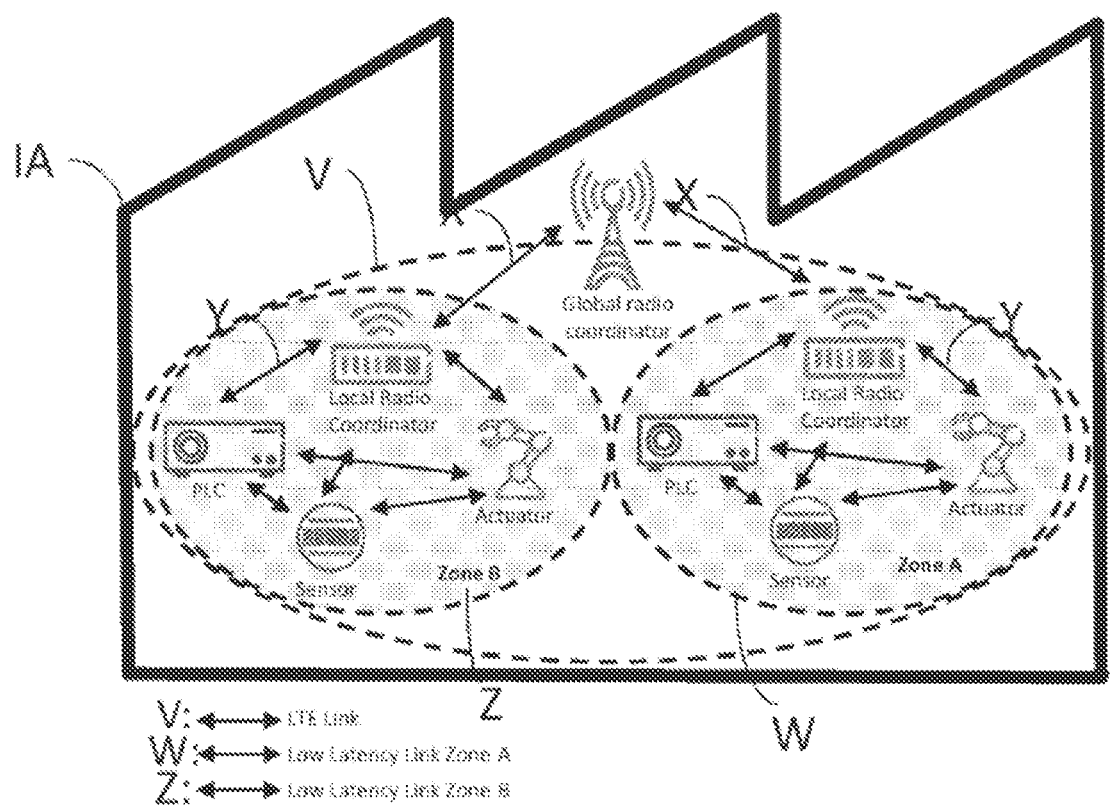
FIG. 4 is another schematic representation of a two-tier coordination hierarchy for wireless communication in an industrial process.

A solution to meet the capacity requirements is to deploy multiple smaller cells managed by local base stations. FIG. 3 illustrates a schematic representation of a two-tier coordination hierarchy for wireless communication in an industrial application IA. This design approach requires appropriate coordination mechanisms among the local base stations (also denoted as LRC in FIG. 3) in order to carry out a deployment covering large factory halls. Said factory hall and or said deployment may be part of one or more industrial applications IA as depicted in FIG. 4. Evidently, without coordination and radio resource management, an arbitrary use of the wireless spectrum in multiple cells leads to inter-cell interference and degradation in Quality of Service (QoS).

Radio resources such as power regulations and user allocations in time and frequency have to be coordinated across a whole factory to achieve the desired coverage and connectivity for each device within an industrial application such as a factory hall. Especially, in order to prevent interference and to ensure that the QoS requirements for the automation processes are satisfied. For this purpose, a two-tier coordination hierarchy for radio resource coordination can be utilized: In the first tier, a single Global Radio Coordinator (GRC) governs coarse grained coordination of radio resources on a broader operational area, a set of Local Radio Coordinators (LRCs) carries out fine-grained coordination of radio resources for process devices in its radio cell. The two-tier coordination hierarchy logically separates mission-critical functionalities from generic functionalities. These functionalities are described in the following.

A global radio coordinator (GRC) may take care of radio resource management and interference coordination among one or more factory cells. The one or more factory cell may employ an LTE based infrastructure or any other cellular radio technology or still other radio technologies. A factory cell may be coordinated by a local radio controller. Thus a two-tier architecture is proposed to manage and control an industrial application.

Bidirectional information exchange between the GRC and the LRCs may be enabled. That is to say, time-frequency resources, transmit power (covering the spatial aspect) may be transmitted from the GRC to the one or more LRCs. In turn, traffic loads and QoS demands (e.g. estimated demands), and feedback on the used resources may be communicated from the one or more LRCs to GRC.

Furthermore, communication between the GRC and the one or more LRCs may take place according to a first radio communication technology such as LTE whereas communication within a cell managed by a LRC may take place according a second radio communication technology. Said first and second radio communication technology may thus make use of different radio communication technologies. However, the case may appear that the first and the second radio communication technologies are the same, notwithstanding the two-tier architecture. Preferably the first radio communication technology makes use of the licensed shared spectrum as described herein.

FIG. 4 is another schematic and more detailed representation of a two-tier coordination hierarchy for wireless communication in an industrial application.

In the first tier, the GRC acts as radio resource coordinator with a global view on the entire factory hall and is responsible for generic functionalities such as authentication, admission control, global resource management, interference coordination among different cells in the licensed spectrum and/or coexistence management in the unlicensed spectrum. In this case operation within the licensed shared spectrum is possible as well. For example, the GRC can reside in the digital unit of the eNodeB in LTE. The GRC covers a larger operational area and handles functionalities on longer time scales (i.e., more than 1 ms). Moreover, having global knowledge about all process devices (capable of wireless communication) in an industrial application, a GRC can decide about the rebalancing of resources when the load within the LRC coordinated cells arises. Please note that all LRCs (and/or alternatively individual process devices) could contribute to the information triggering the balancing and thus reassignment of resources (and thus access spectrum) between different LRCs.

In the second tier, the LRCs operate in a smaller area called local cell. A local cell can cover one or more automation processes and contains several process devices, e.g., Programmable Logic Controllers (PLCs), sensors, and/or actuators. The LRCs manage radio resources of their associated process devices on a more granular time-scale (ca. 1 ms and lower). The LRC is the entity responsible for carrying out the time-critical and reliable communication (at the process device level). This operation can be performed in cooperation with the GRC as well. The rationale behind an LRC covering an entire time-critical automation application and its process devices is to minimize additional communication hops and, thus, keeping the processing and communication latency low. The LRC can also allow for Device-to-Device (D2D) communication between devices, i.e., network assisted D2D. A single LRC can coordinate multiple time-critical automation applications provided that the overall communication requirements such as range, traffic QoS and capacity are satisfied. In contrast, the GRC coordinates several LRCs by managing resources among different local cells on a higher level in order to coordinate and minimize the interference between local cells. Physically, a certain LRC can run on the same physical device as a the GRC, e.g., a digital unit of the eNodeB. Alternatively, a LRC can also run on completely different devices such as a radio base station (RBS). The LRC can also be collocated at a process device in an automation cell or may located at a separate entity.

The system may have a bootstrap phase and an operational phase. In the bootstrap phase all devices including static and mobile process devices may join the network by exchanging some messages with the LRC. In this phase information for administration and/or management of the industrial application, in particular with respect to the wireless communication in the industrial application, can be exchanged between the devices, LRC, and GRC. Subsequently, according to the required needs of the one or more process devices (such as traffic types etc.), the GRC assigns resources to the LRC. Thus a signaling scheme with a licensed shared access (LSA) database is proposed to request (or release) additional spectrum, in cases when the requested resources are not sufficient (or to release the additional spectrum in cases of overprovisioning). Furthermore, devices might have different traffic characteristics, i.e., data sizes, inter arrival rates, priority levels, delay and reliability needs. The traffic characteristics or traffic types may be time varying. As such, the traffic characteristics can be non-homogeneous at different process devices or in different cells. One or more LRCs may obtain resources depending on the number of the process devices and their traffic requirements. Moreover, a classification scheme to map these different characteristics to traffic types is proposed and also a mapping scheme to certain spectrum types based on their traffic requirements. In the operational phase, the quality of service requirements need to be guaranteed. Moreover, the traffic characteristics and network topologies do not remain the same during the course of operation and instead can be variable. This variability needs to be incorporated appropriately. Therefore, present disclosure proposes inter alia a signaling procedure to provide additional access spectrum when needed.

Although a user operating an industrial application IA, such as a factory, has the choice of wireless technologies operating either in licensed or unlicensed frequency bands, both alternatives have their advantages and disadvantages. Exclusive access can be in licensed band or in the LSA band given the constraints on incumbent protection and/or policy matters are satisfied. Shared access may thus occur within the unlicensed spectrum or within the LSA spectrum where multiple secondary users need to share and coexist—like within the unlicensed band.

In addition to the above, license shared access (LSA) may be available, in particular in the inland. LSA is a spectrum sharing principle which can be defined as follows: "A regulatory approach aiming to facilitate the introduction of radio communication systems operated by a limited number of licensees under an individual licensing regime in a frequency band already assigned or expected to be assigned to one or more incumbent users. Under the Licensed Shared Access (LSA) approach, the additional users are authorized to use the spectrum (or part of the spectrum) in accordance with sharing rules included in their rights of use of spectrum, thereby allowing all the authorized users, including incumbents, to provide a certain QoS."

Spectrum sharing schemes are steadily gaining significant attention from various regulatory bodies (in Europe CEPT and in US FCC), standardization groups (ETSI, 3GPP) and the industry. It is expected to be an enabler to gain more capacity. Licensed shared spectrum technologies are currently deployed in Europe under the term License Shared Access (LSA) and in US as spectrum access system (SAS). In the latter case, citizens broadband radio service (CBRS) devices operate in the 3.5 GHz and register with a central coordination database referred to as the SAS. In ETSI and CEPT have developed a similar LSA architecture offering a database for managing spectrum in the 2.3-2.4 GHz. This database is similarly accessed to acquire the right to use the spectrum from the incumbents over a certain period and with some mandating policies such as transmission power regulations. Another similar approach is TV white spaces for the VHF and UHF spectrum where frequencies made available for unlicensed use at locations where the spectrum is not being used by licensed services, such as television broadcasting. However, the concept and design principles of spectrum sharing or LSA can be applied to a broader range of frequencies, which is also currently being proposed.

So far, none of the existing industrial communication systems has addressed a LSA-based signaling scheme to calculate and request a certain amount of spectrum in particular for C-MTC in general and factory automation in particular.

Figure 5A:
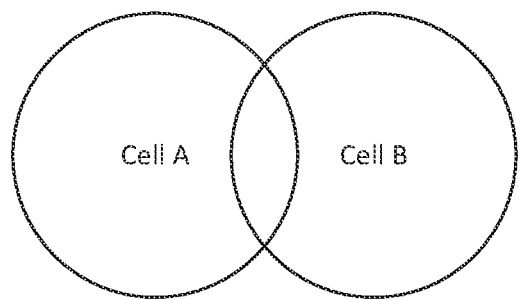
FIG. 5a, 5b, 5c illustrates two cells in an industrial application with different access spectrum assignments.

FIG. 5a shows two automaton cells in the interference range of each other with different access channel assignments. Said cells A, B may correspond to the two cells shown in FIGS. 4 and 5. Of course more than two automation cells may exist. For explanatory purposes however a simplified example of only two automation cells is considered.

Figure 5B:
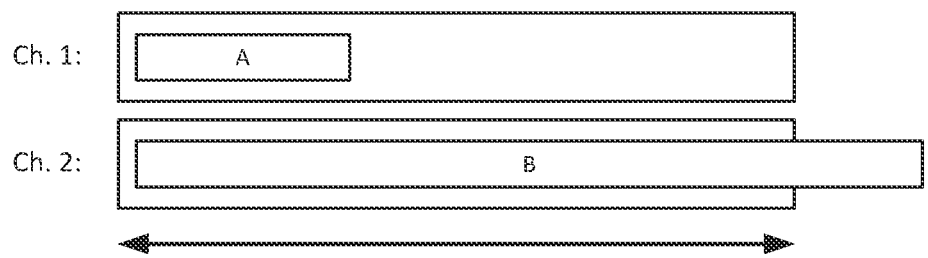

In FIG. 5b the different traffic loads within the cells are illustrated. As shown, the traffic load in channel A only uses about half the channel capacity of Channel Ch1. However, the traffic load in cell B is much more than the capacity of channel Ch2. Thus, cell A possesses more resources compared to cell B, i.e. an unequal assignment of resources in cell A and cell B occurred.

Figure 5C:
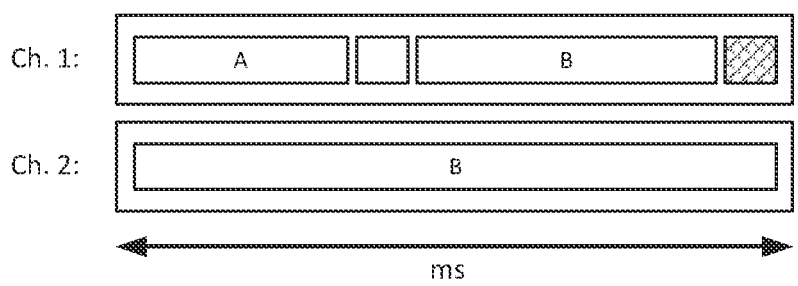

The GRC may (re-)assign the unequal distribution of resources to cell A and cell B as shown in FIG. 5c. Here, channel Ch.1 is assigned to Cell A for a certain portion of time that suffices its needs and channel Ch.2, channel Ch. 1 is assigned for a certain portion of time to cell B.

Generally, the GRC may manage time, frequency and spatial resources in different local cells, such as cells A, B. The GRC may thus manage the wireless communication of a whole factory hall and/or an industrial application in full or partially.

Data exchange between the LRCs and the GRC may be governed by a data format which will be described in the following. The exchange of information may take place on asynchronous or periodic basis based on the configuration setting in the implementation. The message format for a message transmitted from one or more LRCs to a GRC may comprise one or more of the following:

Addressing information: device address (16 bit address, can be an IP address too);

Number of associated nodes: How many nodes are associated with the LRC (any number in the range: 0-255. This could be more than 255 too.

Traffic load: overall traffic load (e.g. average data rate);

Traffic QoS requirements, by way of which the reliability and latency requirements are quantified (16 bits may be used for indicating the latency as well as reliability requirements.);

Location information, e.g. a geo-context information;

QoS feedback index: This metric (16 bits) essentially indicate the achieved, i.e., past QoS requirements;

Interference levels: This metric indicates how much overall interference was encountered. When the nodes are not using the given frequency-time resource, they can measure RSSI (received signal strength), e.g. via one or more dedicated spectrum sensors.

The message format for a message transmitted from a GRC to one or more LRCs may comprise one or more of the following:

Time slot and frequency assignment, transmit power level to be used by LRCs;

Frequency, number of timeslots, LRC address and the transmit power level (e.g. for each time slot and frequency combination).

The data structure proposed may be dynamic and can handle a plurality of LRCs, a plurality of frequency channels and/or timeslots. The transmit power may be set in a scale from 0-100 and mapping to dBm scale, e.g. of a software defined radio (receiver/transmitter).

An exemplary message format (for a GRC->LRC communication) may thus have the following form:

f1: 1,1,2,2,1, . . .
f2: 2,2,1,1,3, . . .
f3: 3,3,3,3,1, . . .

wherein f1, f2, f3 correspond to different frequency bands (frequency channels) and the column (items separated by comma) correspond to time slots, which may be used by a certain LRC for reception and/or transmission within its respective coverage area or cell. Hence, in the example message format provided above, the first two slots (in frequency band f1) are assigned to an LRC with ID "1" in frequency channel 1, next two slots are assigned to an LRC with ID "2" in frequency channel f1, and then again the LRC with ID "1" is assigned to use the time slot in frequency channel f1. In frequency band f3 the first four time slots are assigned to an LRC with "3" and the fifth time slot is assigned to another LRC with ID "1" again.

Another exemplary message format (for a GRC->LRC communication) may have the following form:

{1,2,1,54}, {1,2,2,60}, {1,1,1,20}
{2,2,2,60}, {2,2,1,70}, {2,1,3,30}
{3,4,3,20}, {3,1,1,90}

The first item in the brackets represents the frequency band, the second item the number of time slots assigned to a respective LRC and the third item the ID of the respective LRC. The fourth item represents the transmit power allowed. Of course, the order of the items may be changed. Thus, the first bracket in the first line assigns to the LRC with ID "1" two consecutive slots in frequency f1, wherein both slots have the transmit power limit of 54. If the transmit power is supposed to be different for the two slots, e.g. transmit power shall be changed, e.g. from 54 to 55. Instead of one message of the form {1,2,1,54} two assignment message of the form {1,1,1,54}, {1,1,1,55} may be signaled (subsequently (as two assignment messages), or within one assignment message) to the respective LRC indicating a transmit power change. The first assignment message indicating a transmit power of 54 and the second assignment message indicating a transmit power of 55. Other values of the transmit power, the frequency band, and the number of time slots are of course possible as well. The assigned time-frequency and/or the spatial resources (obtained through transmission power setting (TX)) may be used in a persistent way, i.e., LRCs may use them until a new update is received. A single GRC message may be sent containing information for all LRCs. The LRCs may later use this information to assign the resources to their associated process devices accordingly.

Furthermore, the number of time slots allowed to use in each frequency channel by a certain LRC may be selected dynamically and/or may be based on a latency constraint indicated in the traffic QoS demands from said LRC. This means that e.g. based on the industrial application controlled in a cell managed by an LRC multiple (consecutive) time slots in a first frequency channel may be assigned, e.g. in order to guarantee a timing requirement for said industrial application. The frequency channel may furthermore be selected based on its channel characteristics, that is to say the signal quality achieved via said channel. Thus, a frequency channel f1 may have a better channel quality and thus a better radio reception than a channel f2. Therefore, e.g. control data or other high priority data (e.g. with low latency requirements) may be transmitted via said exemplary channel f1 by a first and a second LRC in different time slots. Best-effort type data may thus be transmitted on said other frequency channel f2 or frequency channel f3. Access spectrum may thus be assigned dynamically and in particular based on the industrial application and or the traffic type to be transmitted in said industrial application. The access spectrum may be assigned in the licensed, unlicensed and/or licensed shared spectrum. In particular the frequency bands f1, f2, f3 may be within one of said spectrum types, respectively.

Figure 6:
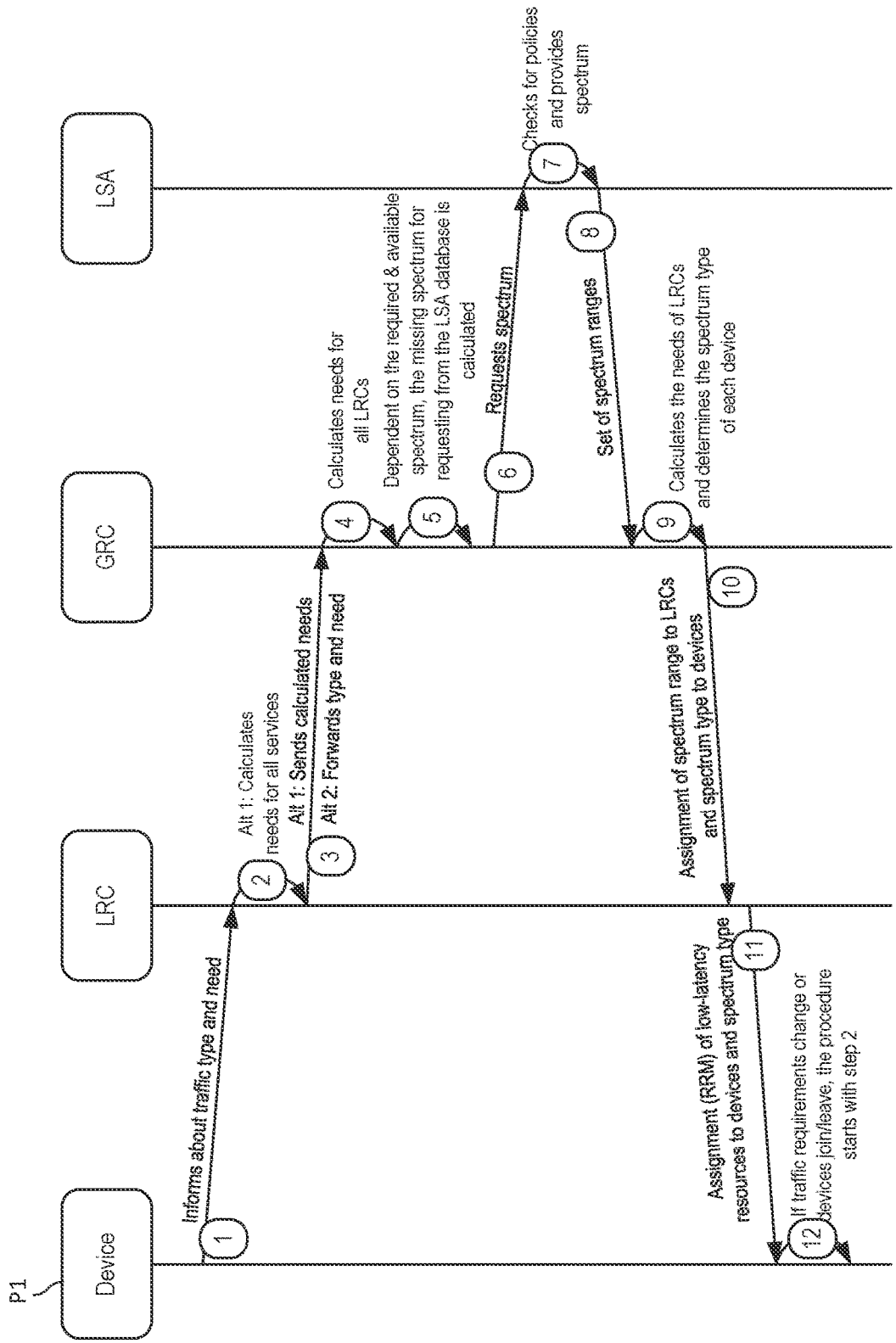
FIG. 6 illustrates a signaling scheme for access spectrum assignment.

Now turning to FIG. 6, an embodiment of a signaling scheme by way of which an access spectrum may be assigned to a process device is shown. In a first step 1, the process device P1 informs an LRC about one or more traffic types to be transmitted and/or received by said process device. Since usually more than one process device P1 is present in an industrial application an LRC may receive indications indicating a traffic type from each one of said multiple devices respectively. The LRC may either calculate and/or amend the access spectrum assignments within its coverage area or cell, e.g. based on a resource assignment previously obtained, in a step 2 and/or send said (re-)calculated access spectrum assignments for a confirmation to the GRC and/or forward the traffic type (indication) received from the one or more process devices to the GRC in step 3. As the case may be the LRC can determine the traffic types on its own, either because it is pre-set in such a manner or because it is configured to calculate the traffic type on its own based on one or more rules, criteria or needs of the industrial application.

Hence, the GRC may calculate the access spectrum assignment for one or more process devices within a cell managed by an LRC. Additionally and/or alternatively the GRC may calculate the access spectrum assignment for a plurality of LRCs in a step 4. In a step 5 dependent on whether sufficient access spectrum to be assigned is already available, missing spectrum may be requested from an LSA database (or a corresponding management system such as an SAS). Hence, in a step 6 a request may be transmitted to said LSA database. The database system may thus in a step 7 check whether such a spectrum is available and whether it is allowed to provide said spectrum, e.g. according to a set of rules or a policy to a certain GRC and/or one or more LRCs. Consequently, a response to said spectrum request is transmitted from the LSA database system to the GRC in a step 8. The response may comprise a set of spectrum ranges which the GRC and/or specific LRCs and/or one or more process devices are (at least temporarily) are allowed to use.

The GRC may (re-)calculate the needs of one or more LRCs and determine the spectrum type of one or more process devices P1 in a step 9, e.g. based on the traffic types of the process devices present manged by an LRC, e.g.

process devices within a cell covered by an LRC. The determined spectrum assignment may thus be send to one or more LRCs in a step 10. The spectrum assignment may include an indication of the spectrum type, i.e. whether it is a licensed spectrum, an unlicensed spectrum or a shared license spectrum. The LRC may forward the access spectrum assignment to the one or more process devices P1 within its cell in a step 11. The one or more process devices P1 may in turn adapt its transmission according to the received access spectrum assignment accordingly. However, the traffic requirements of a process device may change and/or a process device may be newly installed in the industrial application, that is, within the cell managed by the LRC. The process device may then in a step 12 (re-)initiate the procedure explained above beginning with step 1. Alternatively, or additionally to the event-based execution of the method described above, the method may be performed periodically (in time) in order to guarantee appropriate access spectrum for the QoS, reliability, latency and/or other needs of the industrial application.

Figure 7:
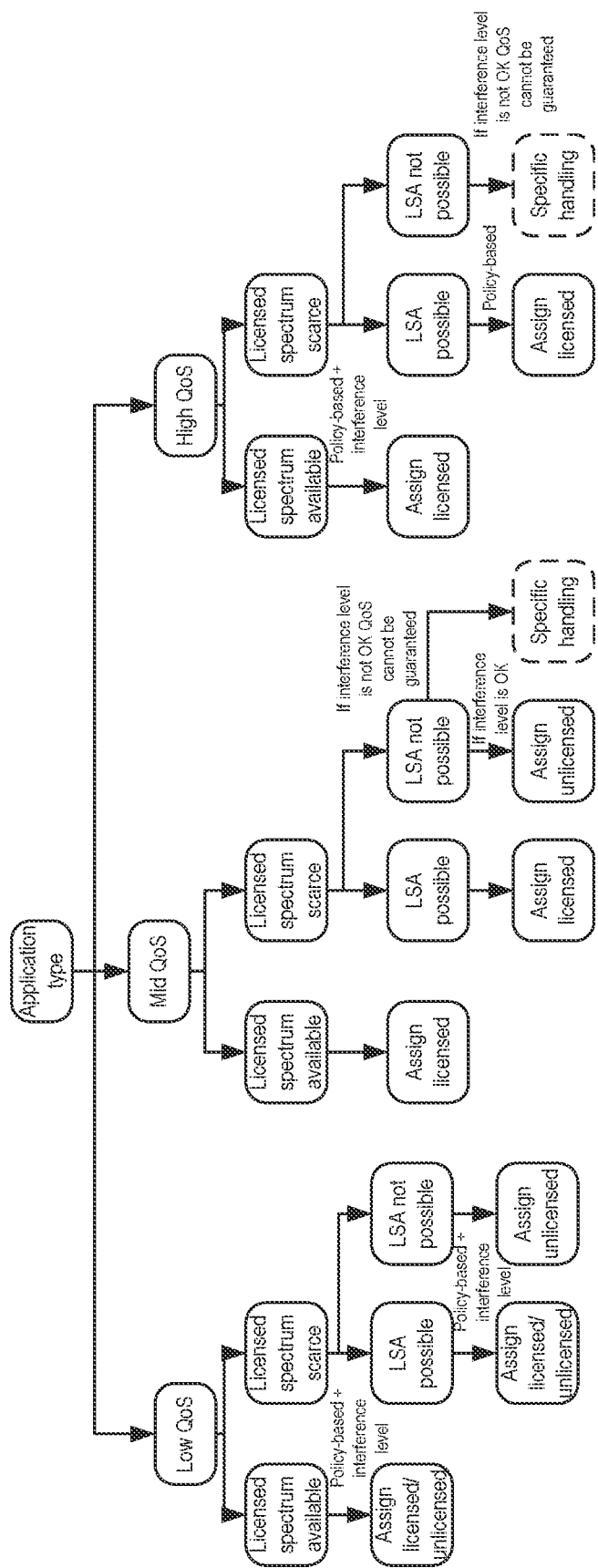
FIG. 7 illustrates an assignment of traffic types to different access spectrum bands.

FIG. 7 shows flow diagram illustrating an exemplary method of access spectrum assignment. As the case may be the method may be performed by a radio control unit which may be part of an LRC, a GRC or both. The radio control unit may be communicatively coupled to a database system managing licensed share access spectrum. For an industrial application it is determined whether the application requires high, low or mid QoS. One or more thresholds, e.g. with respect to latency, may be (pre-)set to determine said mid, low or high QoS categories. Also, it is possible to assign certain applications, e.g. critical with respect to reliability, to a QoS category. Quality of Service (QoS) is one example of a traffic type. Thus, other traffic types with different priorities such as low, mid or high may be employed.

In case the application has a low QoS requirement it is checked whether access spectrum within a licensed spectrum is available. In case licensed spectrum is available, an access spectrum within the licensed spectrum is assigned. In case the licensed spectrum is scarce or not available it is checked whether an access spectrum from a licensed shared spectrum can be acquired. If an access spectrum within the licensed shared access spectrum is available, it is assigned to the application and/or the process device carrying out the application. If the licensed shared access spectrum is not available an access spectrum within the unlicensed spectrum is assigned to the application and the process device, respectively. This is particularly possible since a low QoS requirement allows the usage of unlicensed frequency spectrum in which medium access cannot be guaranteed due to the potential presence of further users and radio access technologies employing listen-before-talk.

In case the industrial application has a mid QoS requirement it is also determined whether licensed spectrum is available. In case the licensed spectrum is available an access spectrum within the licensed spectrum is assigned to the application and/or the process device carrying out the application. In case licensed spectrum is scarce or unavailable it is checked whether an access spectrum within the licensed shared spectrum is available. In case the licensed shared spectrum is available an access spectrum within the license shared spectrum is assigned to the one or more process devices carrying out the application. If the license shared spectrum is not available an access spectrum within the unlicensed spectrum may be assigned as well. However, if the mid QoS requirement cannot be guaranteed or if an interference level is too high some specific handling has to be resorted to. For example, access spectrum assignment may be postponed to a later point in time at which access spectrum becomes available. Depending upon the spectrum availability and/or any policy constraints at a given point in time and the traffic QoS demands present, assignment of spectrum bands for certain time durations (or persistently) is carried out. Also based on the feedback from LRCs, the assignment of resources is adapted accordingly. This all can be performed asynchronously.

The scheme in FIG. 7 gives a non-limiting example that can be implemented for the decision making.

Now turning to the case where a high QoS is required. Here as well, it is checked whether licensed spectrum is available and in case so an access spectrum within the licensed spectrum is assigned to the one or more process devices. However, if the licensed spectrum is not available it has to be resorted to a specific handling, such as clearing spectrum currently used by applications and/or process devices with lower priority traffic type and/or QoS requirements.

Thus, a method of assigning one or more traffic types to different spectrum bands is presented. The spectrum bands may be from different spectra, that is to say from different spectrum types, such as licensed spectrum, unlicensed spectrum and/or licensed shared spectrum.

Figure 8:
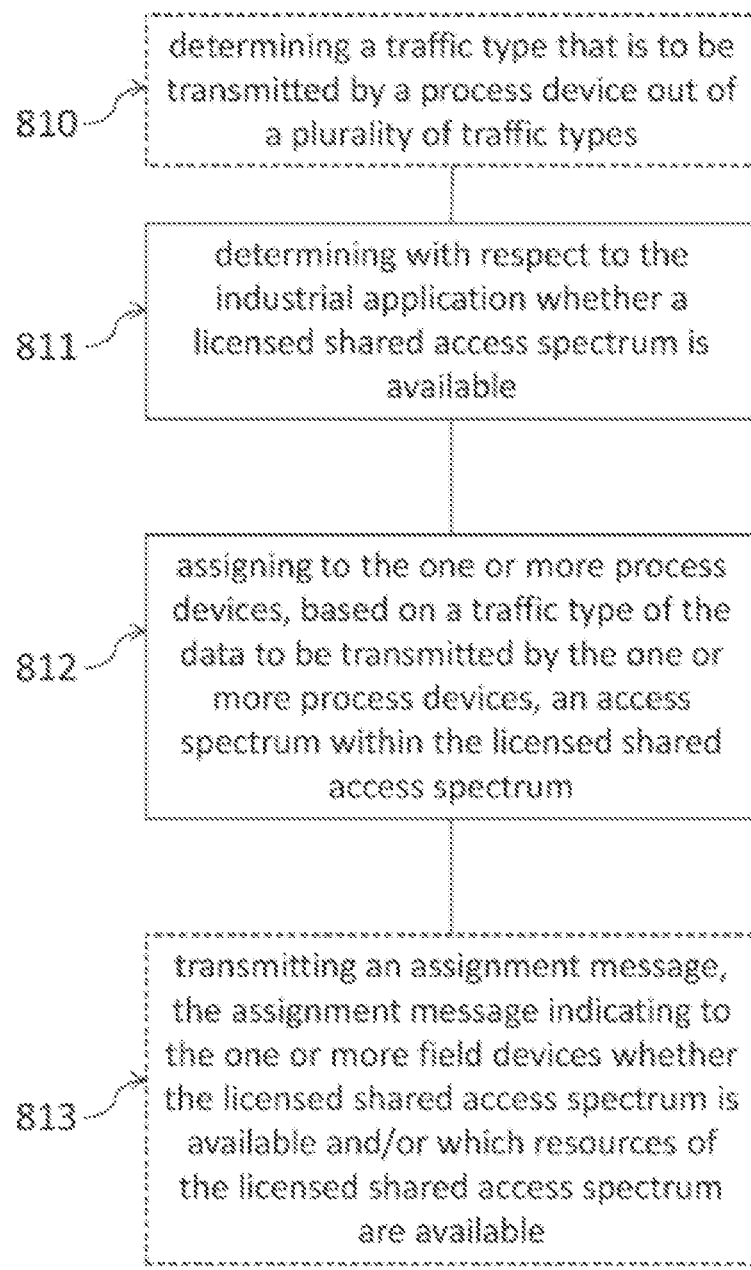
FIG. 8 is a flow diagram illustrating an example method implemented in a radio control unit.

In FIG. 8 a flow diagram illustrating an exemplary method implemented in a radio control unit is show.

In a first optional step 810 a traffic type that is to be transmitted by the process device out of a plurality of traffic types is determined. Said traffic type may be assigned to a data package either implicitly (e.g. the traffic type may be for instance determined based on the content of the data packet.) or explicitly by an additional data field attached to a data package or a message.

Traffic types may include but are not limited to real-time traffic, best-effort or broadband traffic. Certain QoS requirements may be associated with a traffic type. Consequently, (time-/frequency-/spatial) resources may be assigned dependent upon the different traffic types, such that the data traffic may be transmitted via one or more access channels dedicated to said other traffic types. A traffic type may thus be selected from a plurality of traffic types, and the selected traffic type may be assigned to the data packet.

An industrial application may be an industrial process or part of an industrial process which is carried out by one or more process devices. Said one or more process devices may comprise at least one device which is capable of wireless communication, e.g. via a radio module. Said process device may itself be a radio module attached to another process device or part of said process device. Hence, in order to carry out an industrial application a certain reliability and latency is required regarding the wireless communication between the process devices as well.

In a step 811 it is determined whether a licensed shared access spectrum is available with respect to the industrial application. Usage of the licensed share access spectrum may be managed by a database system administrating the license shared spectrum, as e.g. described with respect to FIG. 1. For example, the geographical location/area of the industrial application or of a process device within said industrial application may be used in order to determine whether licensed shared spectrum is available. Instead or additionally, the geographical location/area of the cell managed by the LRC which comprises one or more process devices may be signaled. The geographical location/area may be sent to the database system and an allowance or denial may be received in turn.

In case a part of the license shared spectrum is available an access spectrum within the licensed shared access spectrum is assigned to the one or more process devices, based on a traffic type of the data to be transmitted by the one or more process devices in a step 812. That is, the process device may be scheduled accordingly by the radio control unit which may be part of an LRC and/or a GRC respectively. A corresponding indication may be sent to the process device. The process device may in turn may tune its receiving interface/circuit to the corresponding access spectrum within the license shared spectrum. Hence, an assignment message, the assignment message indicating to the one or more process devices whether the licensed shared access spectrum is available and/or which resources of the licensed shared access spectrum are available, is transmitted in an optional step 813. As described in the above, a corresponding assignment message may further include information about time resources and/or a transmit power threshold.

Figure 9:
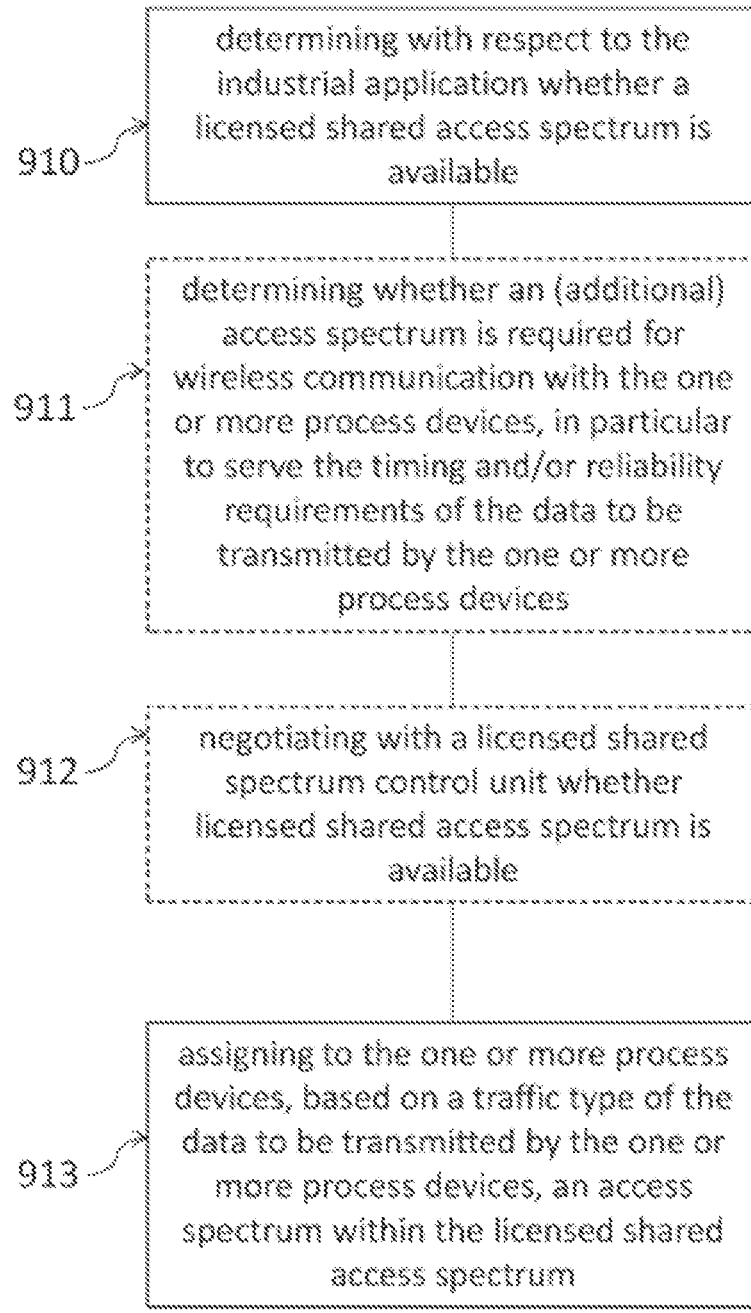
FIG. 9 is a flow diagram illustrating another example method implemented in a radio control unit.

Now turning to FIG. 9, a flow diagram illustrating another example method implemented in a radio control unit is shown. The method of FIG. 9 may be applied additionally or alternatively to the method shown in FIG. 8. Thus, corresponding to step 810 of FIG. 8, in a step 910 it is determined with respect to the industrial application whether a licensed shared access spectrum is available. In an optional step 911 it is determined whether an (additional) access spectrum is required for wireless communication with the one or more process devices, in particular to serve the timing and/or reliability requirements of the data to be transmitted by the one or more process devices. Said step 911 may include a step 912 which includes negotiating with a licensed shared spectrum control unit, such as database system as described in the above, whether licensed shared access spectrum is available. In case the license shared spectrum is available, an access spectrum within the licensed shared access spectrum is assigned to the one or more process devices, based on a traffic type of the data to be transmitted by the one or more process devices in a step 913. Said assignment may be carried out as described in step 813 of FIG. 8.

For the purpose of access spectrum assignment, a capability of one or more process devices may be considered as well. For example, if a process device is unable to operate in a certain frequency band (e.g. perform a LBT mechanism for the unlicensed 5.2 GHz spectrum) said device may not be assigned an access spectrum within a spectrum with such requirements.

Figure 10:
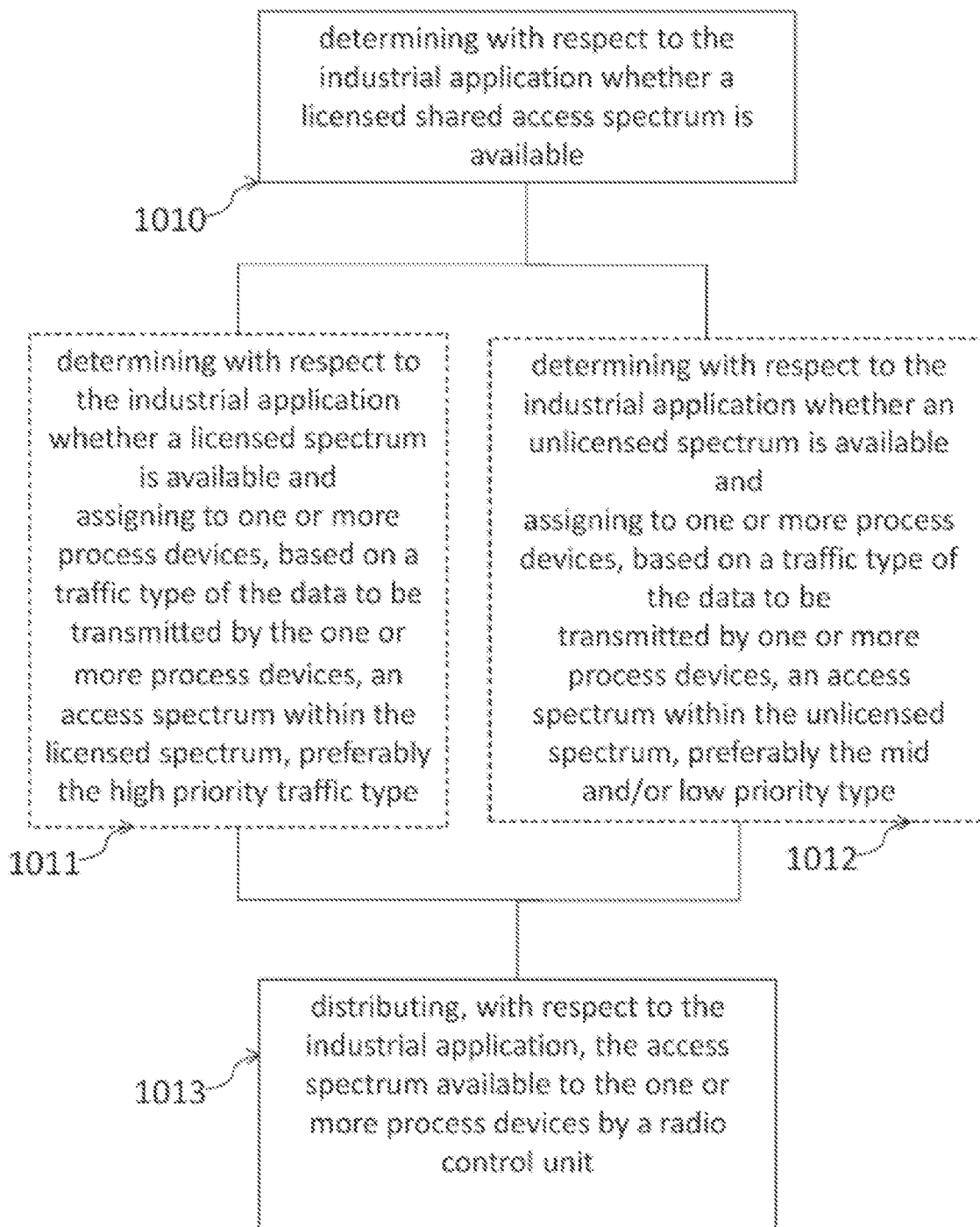
FIG. 10 is a flow diagram illustrating another example method implemented in a radio control unit.

Instead or in addition to traffic type a traffic load may be determined and/or considered for the access spectrum assignment. The access spectrum assignment may thus depend upon the traffic load as well. If the load is small licensed spectrum could suffice but otherwise allocation of further access spectrum may be necessary Now turning to FIG. 10 additionally or alternatively to determining with respect to the industrial application whether a licensed shared access spectrum is available as in steps 811, 910 and 1010 it may be determined with respect to the industrial application in a step 1011 whether a licensed spectrum is available and assigning to one or more process devices, based on a traffic type of the data to be transmitted by the one or more process devices, an access spectrum within the licensed spectrum, preferably the high priority traffic type. Furthermore, it may determined with respect to the industrial application in a step 1012 whether an unlicensed spectrum is available and assigning to one or more process devices, based on a traffic type of the data to be transmitted by one or more process devices, an access spectrum within the unlicensed spectrum, preferably the mid and/or low priority type.

Consequently based on the outcome of the steps 1010, 1011, 1012 the access spectrum available to the one or more process devices may be distributed by the radio control unit. Said distribution may take place by an assignment message as described about in particular with respect to FIGS. 8 and 9. Steps 1011 and 1012 are optional and may not be part of the method proposed or only one of them may be part of the method proposed. Also, it should be mentioned that the order of steps 1010, 1011 and 1012 is not mandatorily in the order shown in FIG. 10 but the order may be reversed or a single step may be performed equating to the result of the method steps 1010, 1011, 1012, Furthermore, different traffic types of one or more process devices may be assigned to the licensed shared access spectrum, the licensed spectrum and the unlicensed spectrum, respectively. Thus a process device may communicate wirelessly within different spectrum types, i.e. the ones mentioned above. For that matter different traffic types may be transmitted exclusively via a certain type of spectrum. However, the case may appear that different traffic types are transmitted within the same spectrum type.

Furthermore, in particular with respect to the two-tier architecture, the one or more local radio control units (LRC) may be controlled by a central control unit (which may very well be a GRC), wherein preferably the central control unit negotiates the access spectrum available with the spectrum access system. Thus the central control unit may consider the needs of multiple local radio control units when distributing the access spectrum available.

Figure 11:
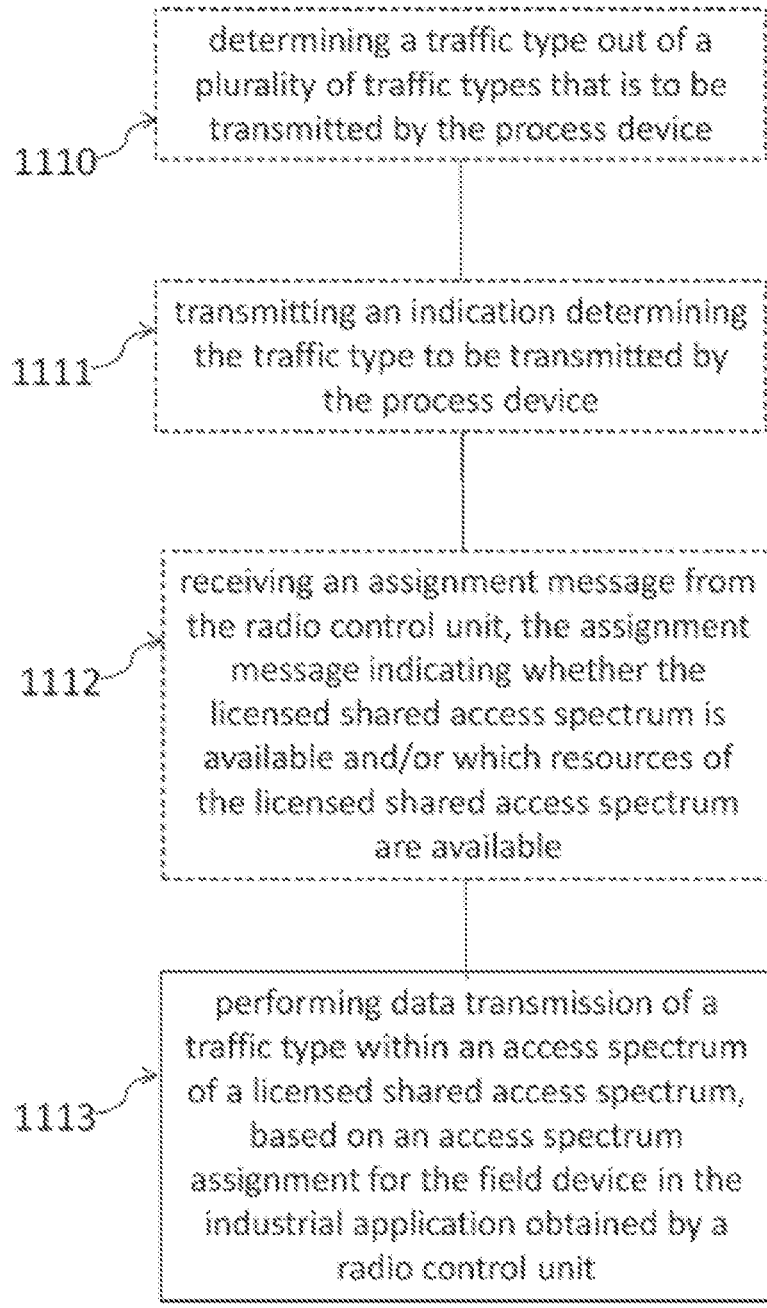
FIG. 11 is a flow diagram illustrating an example method implemented in a process device capable of wireless communication.

Now turning to FIG. 11, a flow diagram is shown, illustrating an example method implemented in a process device capable of wireless communication. In a first step 1110, being optional, a traffic type out of a plurality of traffic types that is to be transmitted by the process device is determined. In a further step 1111, also being optional, an indication determining the traffic type to be transmitted by the process device is transmitted (to the radio control unit, which may very well be a LRC and/or GRC or both). In a further step 1112, also optional, an assignment message is received from the radio control unit, the assignment message indicating whether the licensed shared access spectrum is available and/or which resources of the licensed shared access spectrum are available. In between steps 1111 and 1112 the radio control unit may perform any one of the steps as described in FIGS. 8, 9 and/or 10. Consequently in step 1113 data transmission of a traffic type within an access spectrum of a licensed shared access spectrum, based on an access spectrum assignment for the process device in the industrial application obtained by a radio control unit is performed. Additionally, and/or alternatively, data transmission within the licensed spectrum and/or the unlicensed spectrum may be performed according to the assignment message(s) received by the process device(S) configuring the process device(S) to perform data transmission accordingly.

As mentioned before with respect to FIG. 10, data transmission of one or more of a plurality of traffic types may be performed on an access spectrum within a licensed spectrum, an unlicensed spectrum and/or in a shared licensed spectrum, respectively.

Figure 12:
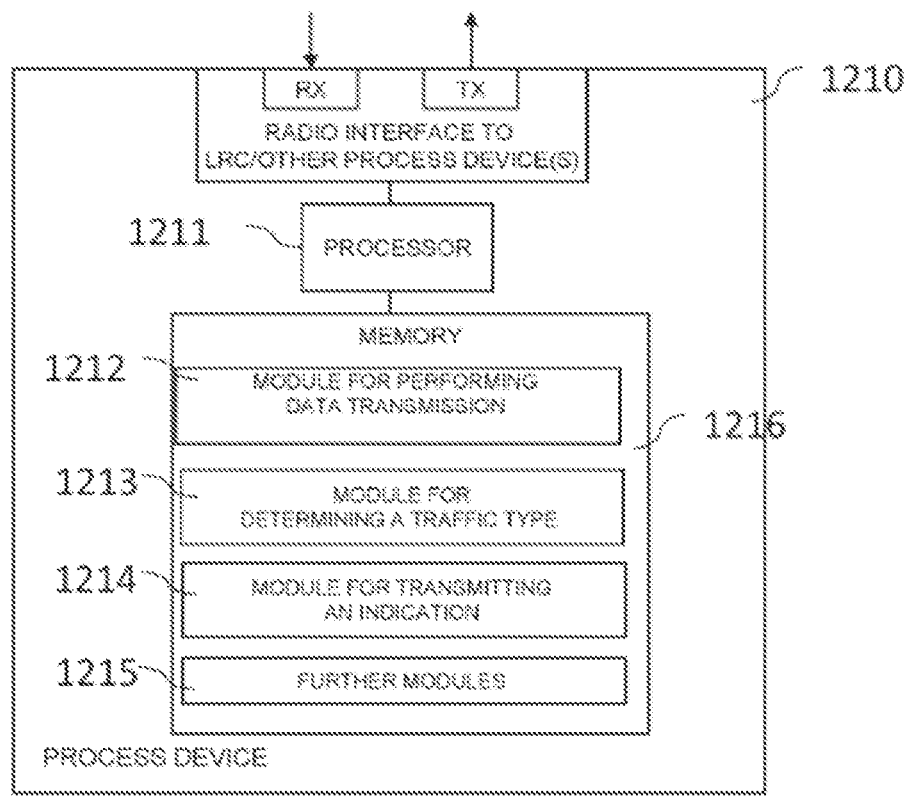
FIG. 12 schematically illustrates exemplary structures of a process device.

FIG. 12 schematically illustrates exemplary structures of a process device 1210. As described previously the process device 1210 may be a sensor, an actuator or a PLC. In the illustrated structure, the process device 1210, includes a radio interface for performing data transmission to or from a radio control unit such as an LRC. Furthermore, the radio interface may perform data transmission to one or more other process devices. It is to be understood that for implementing transmitter (TX) functionalities the radio interface includes one or more transmitters, and that for implementing receiver functionalities (RX) functionalities the radio interface may include one or more receivers. Further, the process device includes a processor 1211 coupled to the radio interface and a memory coupled to the processor. The memory 1216 may include a ROM, e.g., a flash ROM, a RAM, e.g. a DRAM or SRAM, a mass storage, e.g., a hard disk or solid state disk, or the like. The memory includes suitably configured program code to be executed by the processor so as to implement the above-described functionalities of the process device. More specifically, the memory may include a module 1212 for accomplishing provision of performing data transmission of a traffic type within an access spectrum of a licensed shared access spectrum, based on an access spectrum assignment for the process device in the industrial application obtained by a radio control unit. Further, the memory may also include a module 1213 for determining a traffic type out of a plurality of traffic types that is to be transmitted by the process device. Further, the memory may also include a module 1214 for transmitting an indication determining the traffic type to be transmitted by the process device. Further, the memory may also include one or more further modules 1215 for performing other method steps as described in connection with FIG. 11. Said further modules 1215 may be setup to perform further functions of the process device in order to control and/or manage the industrial process or part of said industrial process. In the case of a sensor the process device may e.g. provide sensor data, such as measurement data that shall be transmitted, e.g. to a PLC.

Figure 13:
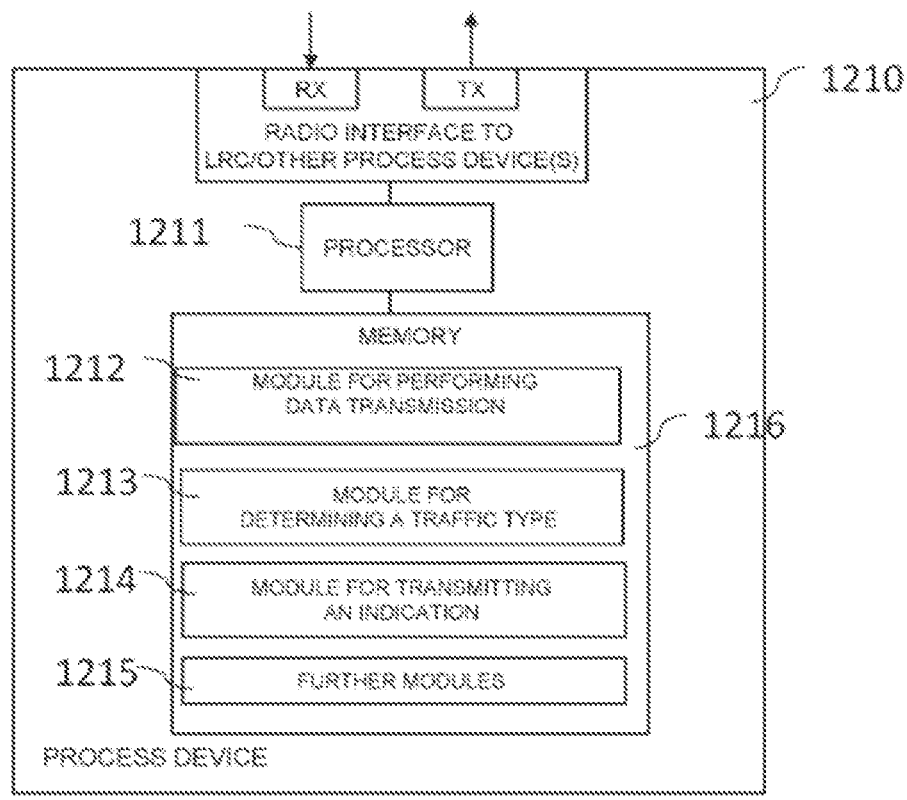
FIG. 13 schematically illustrates exemplary structures of a local radio coordinator.

FIG. 13 schematically illustrates exemplary structures of a local radio coordinator (LRC) for implementing any one of the above-described concepts in a LRC.

In the illustrated structure, the LRC 1310 includes a radio interface for performing data transmission to and/or from a process device. The modules as depicted in FIG. 13 and as described in the following may be distributed on several nodes and do not have to be present in a single node or device. It is to be understood that for implementing transmitter (TX) functionalities the radio interface may include one or more transmitters, and that for implementing receiver functionalities (RX) functionalities the radio interface may include one or more receivers.

Further, the LRC includes a processor 1311, a memory 1312 coupled to the processor and optionally, coupled to the interface to a global radio coordinator (GRC). The memory 1312 may include a ROM, e.g., a flash ROM, a RAM, e.g., a DRAM or SRAM, a mass storage, e.g. a hard disk or solid state disk, or the like. The memory includes suitably configured program code to be executed by the processor so as to implement the above-described functionalities of the radio control and the LRC respectively. More specifically, the memory may include a module for accomplishing the provision of providing a plurality of access channels for accessing the network dependent on a traffic type out of a plurality of traffic types. The memory may further include a module 1313 for determining a traffic type that is to be transmitted by a process device out of a plurality of traffic types. The memory may further include a module 1314 for assigning to the one or more process devices, based on a traffic type of the data to be transmitted by the one or more process devices, an access spectrum within the licensed shared access spectrum.

The memory may further include a module 1315 transmitting an assignment message, the assignment message indicating to the one or more process devices whether the licensed shared access spectrum is available and/or which resources of the licensed shared access spectrum are available. Further, the memory may also include one or more further modules 1316 for performing other method steps as described in connection with FIG. 8, 9 or 10. Said further modules 1316 may be setup to perform further functions of the LRC in order to control or manage the industrial process or part of said industrial process, in particular with respect to wireless communication with in the industrial application.

Figure 14:
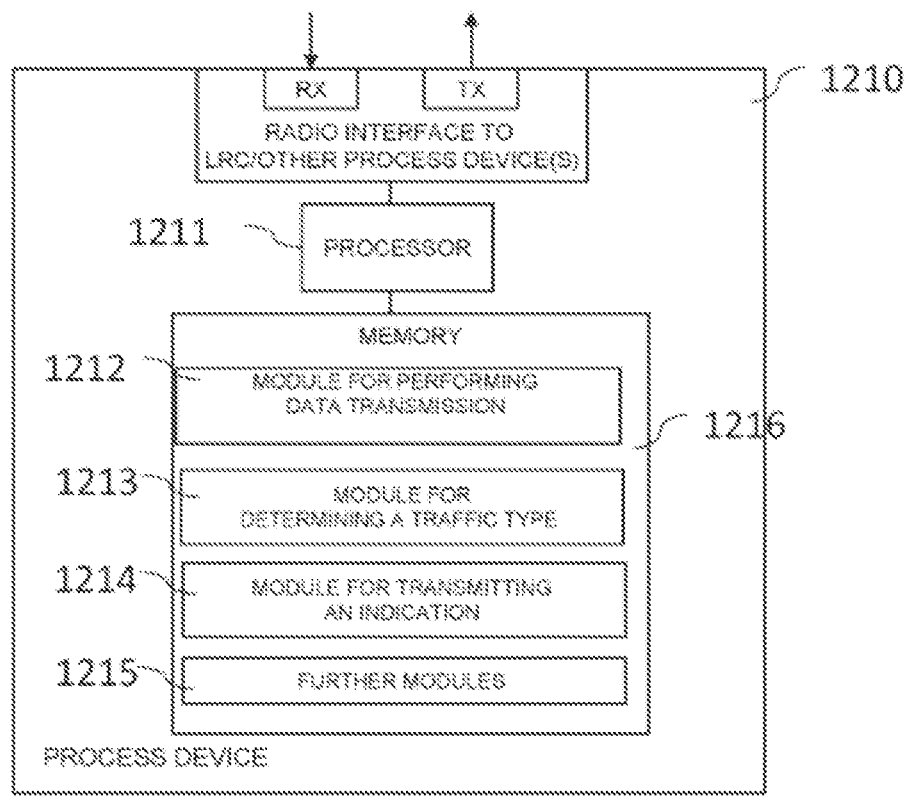
FIG. 14 schematically illustrates exemplary structures of a global radio coordinator.

FIG. 14 schematically illustrates exemplary structures of a global radio coordinator (GRC) for implementing any one of the above-described concepts in a GRC.

In the illustrated structure, the GRC 1410 includes an interface for performing data transmission to and/or from an LRC. The modules as depicted in FIG. 14 and as described in the following may be distributed on several nodes and do not have to be present in a single node or device. It is to be understood that for implementing transmitter (TX) functionalities the interface may include one or more transmitters, and that for implementing receiver functionalities (RX) functionalities the interface may include one or more receivers.

Further, the GRC includes a processor 1411, a memory 1412 coupled to the processor and optionally, coupled to the interface to a license shared spectrum control unit. The memory 1412 may include a ROM, e.g., a flash ROM, a RAM, e.g., a DRAM or SRAM, a mass storage, e.g. a hard disk or solid state disk, or the like. The memory includes suitably configured program code to be executed by the processor so as to implement the above-described functionalities of the radio control and the GRC, respectively. More specifically, the memory may include a module 1413 for calculating the needs for one or more LRCs. The memory may further include a module 1414 for calculating the spectrum required due to the needs and/or requirements of the industrial process(es) of the one or more LRCs. The memory may further include a module 1415 for negotiating with a licensed shared spectrum control unit (e.g. a database system as described in the above) whether licensed shared access spectrum is available. Further, the memory may also include one or more further modules 1416 for performing other method steps as described in connection with FIG. 8, 9 or 10. Said further modules 1416 may be setup to perform further functions of the GRC in order to control or manage the industrial process or part of said industrial process and/or said one or more LRCs. An implementation can also be on a FPGA, ASIC, GPU as a software routine, or firmware.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of transmission scheduling for one or more process devices in an industrial application, capable of wireless communication, implemented by a radio control unit, the method comprising:

determining a traffic type of data that is to be transmitted by the one or more process devices out of a plurality of traffic types;

determining, with respect to the industrial application, whether a licensed spectrum is available; and upon determining that the licensed spectrum is not available, performing at least one of:

assigning, to the one or more process devices, based on the traffic type of the data to be transmitted by the one or more process devices is of mid or low priority, an access spectrum within licensed shared access spectrum or unlicensed shared access spectrum; and assigning, to one or more process devices, based on the traffic type of the data to be transmitted by the one or more process devices is of high priority, an access spectrum within the licensed spectrum by clearing the licensed spectrum currently used by the industrial application that is of low priority.

2. The method of claim 1, wherein the plurality of traffic types correspond to different timing and/or reliability requirements of the data to be transmitted by the one or more process devices.

3. The method of claim 1, further comprising:
determining the traffic type based on an indication received from the one or more process devices.

4. The method of claim 1, further comprising:
negotiating, with a licensed shared spectrum control unit, whether the licensed shared access spectrum is available.

5. The method of claim 1, further comprising:
assigning different traffic types of the one or more process devices to the licensed shared access spectrum, a licensed spectrum and an unlicensed spectrum.

6. The method of claim 1, further comprising:
distributing, with respect to the industrial application, the access spectrum available to the one or more process devices by one or more local radio control units, each local radio control unit providing one or more radio cells for the industrial application.

7. The method of claim 6, further comprising:
controlling the one or more local radio control units by a central control unit, wherein the central control unit negotiates the availability of the access spectrum with a spectrum access system.

8. A method of data transmission in an industrial application, implemented by a process device capable of wireless communication, the method comprising:

determining a traffic type out of a plurality of traffic types of the data that is to be transmitted by the process device;

determining need of an access spectrum for the wireless communication with the process device;

transmitting information of the need the access spectrum to a radio control unit;

receiving an assignment message from the radio control unit, the assignment message indicating whether a licensed spectrum is available; and performing the data transmission of the traffic type, within the access spectrum of the licensed spectrum, based on an access spectrum assignment for the process device, in the industrial application, obtained by the radio control unit, wherein when the assignment message indicates that the licensed spectrum is not available, performing the data transmission using one of licensed shared access spectrum and unlicensed shared access spectrum for the traffic type of data to be transmitted by the one or more process device is of mid or low priority; and performing the data transmission within the licensed spectrum for the traffic type of data to be transmitted by the one or more process device is of high priority.

9. The method of claim 8, wherein the plurality of traffic types correspond to different timing and/or reliability requirements of the data to be transmitted by the process device.

10. The method of claim 8, further comprising:
transmitting an indication determining the traffic type to be transmitted by the process device.

11. The method of claim 8, further comprising:
performing the data transmission of one or more of a plurality of traffic types on an access spectrum within a licensed spectrum, an unlicensed spectrum, and/or in a shared licensed spectrum.

12. The method of claim 8, further comprising:
performing the data transmission of different traffic types on an access spectrum in the licensed shared access spectrum, a licensed spectrum, and/or an unlicensed spectrum.

13. A radio control unit comprising a memory and at least one processor, the memory containing instructions executable by the at least one processor, wherein the radio control unit is operative to perform the method of claim 1.

14. A process device capable of wireless communication, the process device comprising a memory and at least one processor, the memory containing instructions executable by the at least one processor, wherein the process device is operative to perform the method of claim 8.

15. The method of claim 1, wherein the one or more process devices comprises at least one of a sensor, an actuator, and/or a process controller.

16. The method of claim 1, further comprising:
transmitting an assignment message, the assignment message indicating to the one or more process devices, whether the licensed shared access spectrum is available and/or which resources of the licensed shared access spectrum are available.

* * * * *